United States Patent [19]

Eriksson

[11] Patent Number: 5,215,559
[45] Date of Patent: Jun. 1, 1993

[54] DEVICE FOR SEPARATING FIBRES AND GAS

[75] Inventor: H E Kenneth Eriksson, Sundsvall, Sweden

[73] Assignee: Sunds Defibrator Industries Aktiebolag, Sweden

[21] Appl. No.: 752,468

[22] PCT Filed: Mar. 15, 1990

[86] PCT No.: PCT/SE90/00167
§ 371 Date: Aug. 23, 1991
§ 102(e) Date: Aug. 23, 1991

[87] PCT Pub. No.: WO90/11836
PCT Pub. Date: Oct. 18, 1990

[30] Foreign Application Priority Data

Apr. 5, 1989 [SE] Sweden .............................. 8901191

[51] Int. Cl.$^5$ ............................................ B01D 19/00
[52] U.S. Cl. ........................................ 55/184; 55/185; 55/204; 55/399; 55/401; 55/415
[58] Field of Search .................. 55/184, 185, 203, 204, 55/593, 399, 401, 406, 408, 415

[56] References Cited

U.S. PATENT DOCUMENTS

| 3,224,173 | 12/1965 | Webb | 55/408 |
| 4,162,148 | 7/1979 | Furstenberg | 55/399 X |
| 4,604,109 | 8/1986 | Koslow | 55/185 X |

Primary Examiner—Charles Hart
Attorney, Agent, or Firm—Lerner, David, Littenberg, Krumholz & Mentlik

[57] ABSTRACT

A device for separating fibers and gas, comprising a cyclone (1) with inlet (2) for a mixture of fiber/gas and separate outlets (3 and 5, respectively) for fibers and gas, respectively. In front of the gas outlet (5) a screen (6, 10) is located, which is provided with apertures and attached on a rotatable shaft, so that the rotation of the screen gives rise to accelerations and forces preventing fibers from passing through the apertures in the screen (6, 10).

6 Claims, 2 Drawing Sheets

DEVICE FOR SEPARATING FIBRES AND GAS

This invention refers to a device for the separation of fibres and gas.

At the manufacture of mechanical pulp from fibre material the fibres are freed by working the fibre material mechanically. This is carried out normally by refining the material in the form of wood chips in one or more steps. The chips possibly can be preheated and pretreated with chemicals. At the refining, which is carried out at overpressure between two opposed refiner discs rotatable relative to one another, large amounts of heat are developed which causes the liquid following along with the chips to evaporate.

The fibres after their freeing are to be subjected to continuous processing in subsequent steps. Prior thereto the steam developed is separated together with other gases, such as air. The separation normally takes place in a special device of cyclone type, where the fibres are separated from the gas following along by centrifugal action.

The gas discharged from the cyclone is desired to be entirely free of fibres and fibre fragments so as to be applicable to other purposes. This is in practice scarcely possible, because conventional cyclones cannot bring about a complete separation. The steam includes fibre particles, which renders the application field for the separated steam to be restricted. The steam then can be utilized only for preheating the fibre material or be used in a heat exchanger or in some other place where the fibre content is of minor importance. Steam containing fibres, however, can give rise to problems by clogging the conduits.

According to the present invention, the aforesaid problem is solved in that the separation of gas and fibres is close to 100%. The fibres thus are prevented from following along with the gas by means of a screen, which is provided with apertures and rotated at such a speed, that resulting accelerations and forces prevent the fibres from passing through the apertures of the screen.

The invention is described in the following in greater detail by way of two embodiments thereof and with reference to the accompanying drawings.

Figure 1:
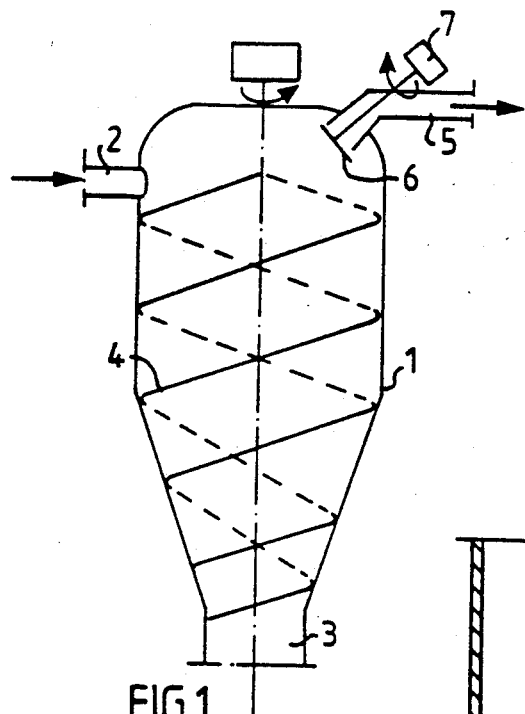
FIGS. 1 and 2 show two embodiments of the device according to the invention.

The embodiment according to FIG. 1 comprises a cyclone 1 with an inlet 2 for gas and fibres. The inlet is located tangentially so that the separation of the fibres is effected by centrifugal action. The fibre material can be removed through a fibre outlet 3 in the bottom of the cyclone. A screw thread 4 is provided rotatably in the cyclone for scraping down the fibres adhering to the walls. In the upper part a gas outlet 5 is located. In front of the gas outlet a perforated screen is provided, which covers the outlet and is formed as a plane disc 6, which can be rotated at high speed by means of a drive arrangement 7.

Gas and fibres entering through the inlet 2 are separated in the cyclone by centrifugal action, whereby the fibres are taken out downwardly through the fibre outlet 3, and the gas is taken out upwardly through the gas outlet 5. The fibres and fibre fargments, which in spite thereof follow along with the steam toward the gas outlet 5, are prevented from passing out through the outlet by the rotating disc 6. The fibres approaching the disc are thrown outward partially by a border layer nearest to the disc and partially by the edges of the perforations. The gas, however, is passed through so that the separation is substantially 100%. A control device can be arranged for sensing the axial load on the disc, so that a possible clogging of the perforations throttles down the fibre supply.

Figure 3:
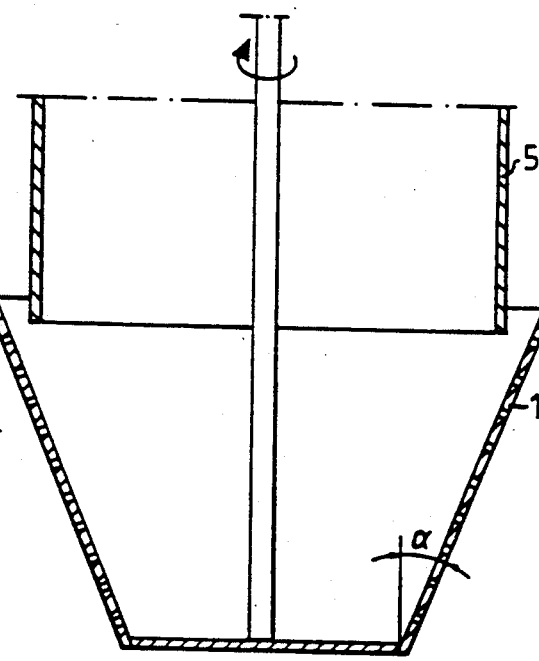
FIG. 3 shows in greater detail the design of the perforated screen in FIG. 2.
Figure 2:
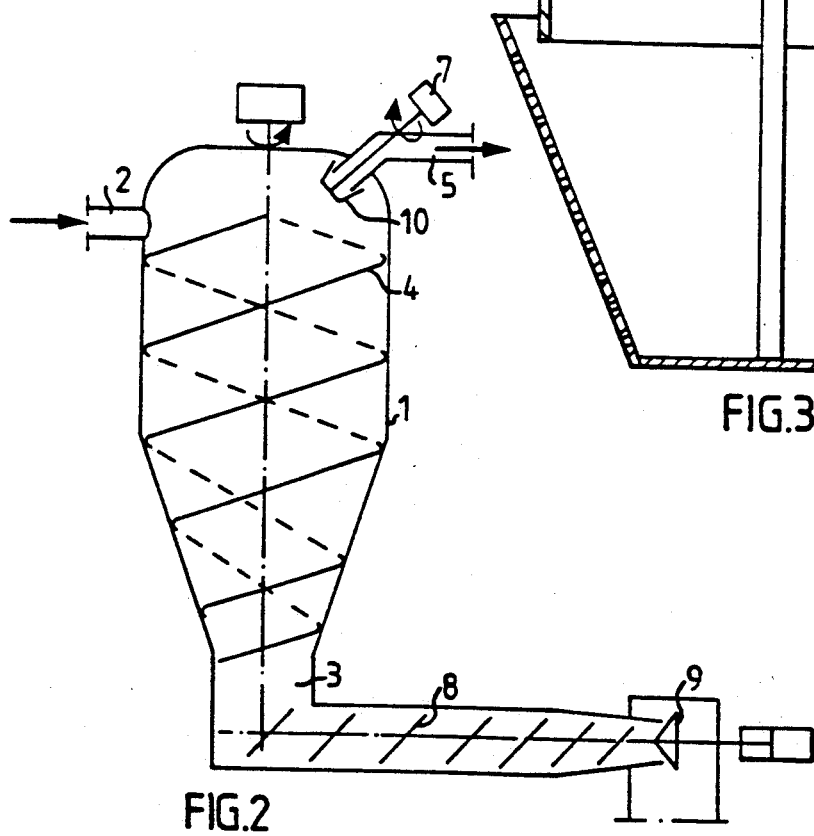

The cyclone 1 according to FIG. 2 is provided with a discharge means consisting of a screw 8, which feeds out the fibre material in the form of an air-tight plug. A holder-on 9 prevents the plug from being blown out by the pressure in the cyclone. In front of the gas outlet 5 a screen is located, which consists of an unperforated bottom combined with a conical perforated wall element 10, which forms the angle $\alpha$ with the rotation axis, see FIG. 3. The function is the same as in the cyclone shown in FIG. 1.

Figure 6:
FIGS. 6, 7 and 8 are cross-sections of different designs of the screen wall.

The apertures in the screen can be of different shapes, for example round, oblong or in the form of slits. The screen surface can be smooth, FIG. 6, or be provided with means generating pressure or vacuum in connection to the apertures, FIG. 7. A screen in the form of a folded sheet may also be used, as shown in FIG. 8.

Figure 4:
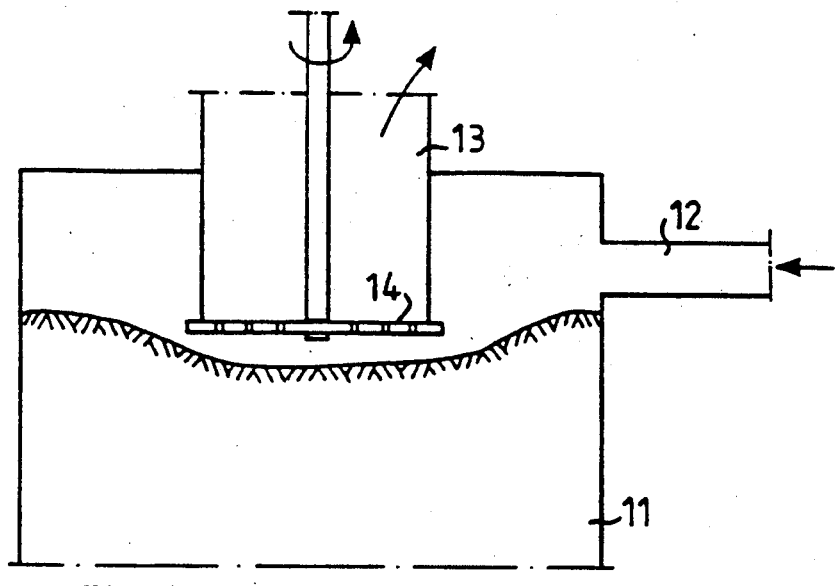
FIGS. 4 and 5 show two devices used at experimental runs.

Tests have been made with different devices for preventing fibres from leaving the cyclone with the gas. At these tests the equipment shown in FIG. 4 was used. Air and fibres were supplied to a cyclone 11 through an inlet 12. In front of a central outlet 13 a plane rotatable disc 14 provided with holes or slits was positioned. Of the hole diameters tested, 3, 6 and 8 mm, the diameters 3 and 6 mm yielded the best result.

Figure 7:
Figure 8:

Discs provided with elevations in connection to the holes also yielded good test results, see FIG. 7. The rotation direction of the disc, and thus the vacuum or pressure at the holes of the disc, depend on the rotation direction of the incoming flow of gas and fibres and on the type of fibres. Over the disc a very small pressure drop was measured, 10-20 mm $H_2O$. The fibre speed in the cyclone was 30-35 m/s, and the outgoing cleaned gas had a speed of about 2 m/s.

The tests also showed that no holes should be placed near the centre of the disc where the speed is too low.

Figure 5:
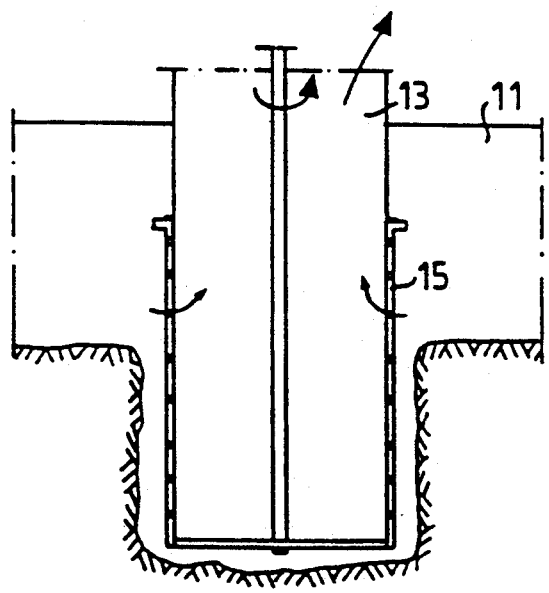

As a consequence of these tests, the design of the perforated screen was changed to a cylindric wall element 15. The diameter was 185 mm, and the height was 270 mm, see FIG. 5. By the cylindric design of the perforated screen, the entire perforated surface is given the same speed, which implies that the separation effect is constant across the entire surface. The open area thereby can be given a greater size, and the thereby the pressure drop above the screen decreases.

This test was carried out with a folded shell surface of the wall element 15, see FIG. 8. The holes were arranged on a surface with an angle of 45° to the radius. When the cylindric wall element 15 was moved down into a bed of fibres, no fibres were passed through unless only about 50 mm of the element remained above the surface of the fibre bed. This proves the effectiveness of the separation.

The angle of the screen to the rotation axis, thus, can be varied between 0° and 90°, preferably between 0° and 60°. A conical screen may have its greatest diamater upwardly or downwardly, i.e. taper downward or upward.

The screen further should be designed and rotated so that the circumferential speed is at least as high as the gas speed. The gas speed through the apertures shall be approximately the same as in the outgoing pipe line, i.e. the open area in the screen shall be approximately equal to the cross-sectional area of the outlet pipe.

The invention, of course, is not restricted to the embodiments shown, but can be varied within the scope of the invention idea.

I claim:

1. A device for separating fibres and gas, comprising a cyclone with an inlet for a mixture of fibres and gas and separate outlets for fibres and gas, respectively, where a screen provided with apertures is attached to a rotatable shaft located in front of the gas outlet, so that the outgoing gas is forced to pass through the apertures, characterized in that the screen forms an angle of between 0° and 60° with respect to the rotation axis, that the surface of the screen is folded or provided with means generating pressure or vacuum in connection to the apertures, whereby a drive means for the shaft is provided for rotating the screen at a speed, so that resulting accelerations and forces prevent fibres from passing through the apertures in the screen.

2. A device as defined in claim 1, characterized in that the screen is substantially cylindrical.

3. A device as defined in any one of the preceding claims, characterized in that the open area of the apertures shall be substantially the same as the area of the outlet.

4. A device as defined in claim 1, characterized in that the apertures have a size corresponding to a hole diameter of 3–6 mm.

5. A device as defined in claim 1, characterized in that the surface of the screen is folded and the apertures are located on the rear side of the folds, seen in the direction of rotation.

6. A device as defined in claim 1, characterized in that a control means is provided for restricting the supply of fibre/gas when the outlet is clogged.

* * * * *